April 19, 1966  W. B. McCORMACK  3,246,764
FLUID SEPARATION
Filed Nov. 30, 1961
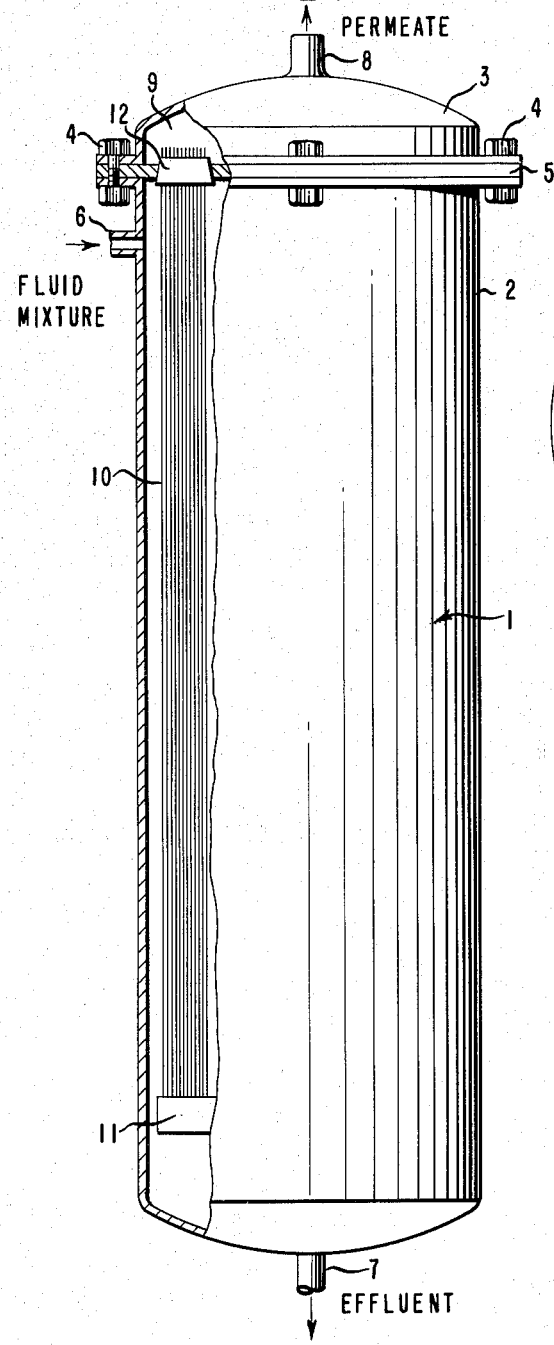
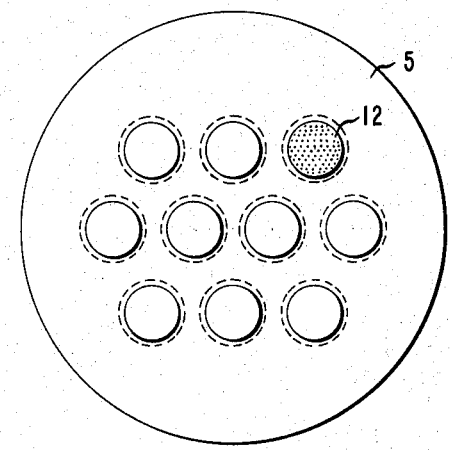
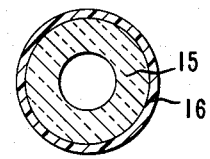
INVENTOR
WILLIAM B. McCORMACK
BY *Cullen H. Frey*
ATTORNEY United States Patent Office 3,246,764
Patented Apr. 19, 1966

3,246,764
FLUID SEPARATION
William B. McCormack, Wilmington, Del., assignor to
E. I. du Pont de Nemours and Company, Wilmington,
Del., a corporation of Delaware
Filed Nov. 30, 1961, Ser. No. 156,015
5 Claims. (Cl. 210—321)

This invention relates to an improvement in the apparatus for separating fluid mixtures by what has generally been referred to in the art as "activated diffusion."

Various apparatuses have been described for the separation of one or more components of fluid mixtures, both gaseous and liquid, by permeation through non-porous-membranes—see the article by R. M. Barrer entitled, "Activated Diffusion in Membranes," reported in Transactions of the Faraday Society, vol. 35, pp. 644–656 (1939). The same phenomenon is referred to in U.S. Patents 2,540,151 and 2,540,152 as "permeation" through thin, non-porous membranes. In describing the present apparatus, the terms "permeation" and "activated diffusion" will be used as synonymous.

The non-porous membranes which are used to effect the separation of fluids have been various forms of glass and various types of organic films. In each case, one or more of the components of the fluid mixture permeates the non-porous barrier by the process of activated diffusion at a different rate than other components of the mixture. The separation of the different components of either gases or liquids appears to depend on their chemical constitution and molecular size. It has been repeatedly stressed in the literature that, in order to achieve permeation of a sufficient amount of any one component of a mixture to make the apparatus useful in the separation of mixtures, it is necessary to have an extremely large surface area of a very thin membrane. Ordinarily, the thinner the membrane, the faster the permeation rate, but one of the big problems has been to find means of supporting large surface areas of the very thin, non-porous membrane.

In order to assess precisely the efficiency of any geometrical arrangement, one can assign an "efficiency number," defined below. The efficiency number is independent of the materials used and of the conditions under which the apparatus is operated. For a given barrier composition, a given mixture to be separated, a given temperature and given input and output pressures, the efficiency number is a measure of the maximum rate at which permeation can be expected to occur. The efficiency number may be defined by the expression $$\text{Efficiency number} = \frac{A}{V \times T \times \text{pi}}$$

In this formula, $A/V$ represents the effective area of permeation barrier per unit volume of permeation apparatus, $T$ represents the thickness of the permeation barrier, and pi is the ratio of the circumference to the diameter of a circle. It can be seen that for maximum efficiency the barrier must be as thin as possible, in addition to providing a large surface area per unit volume of the permeation apparatus. Insofar as the hollow tubular filaments or fibers which constitute the permeation barrier of this invention are concerned, the area A means the effective hollow filament surface area of the hollow filament. The hollow filaments obviously form the permeation barrier. The effective area of hollow filament represents a mean value between the outer surface area and the inner surface area. Obviously, the effective area of a hollow filament of uniform cross section will vary in direct proportion to the diameter or perimeter of the filament. It is believed to be clear that the thicker the walls of a hollow filament the smaller the effective surface area becomes relative to the actual exterior surface area.

Plastic films having a thickness of from 2.5 to 250 microns have been employed as the permeation barrier in the form of flat plates, and in some cases in the form of tubes of relatively large diameter. However, it has been found that these films often become swollen in time, due to the solution of the permeating fluid in the film, which, together with the pressure difference between one side of the film and the other during the process, tends to weaken it, finally causing the film to rupture. In order to strengthen the film, various porous supports have been suggested such as very fine wire screen, porous sintered metals and ceramic materials. These, however, have all proved unsatisfactory for practical use. The major disadvantage appears to be their large pore size, as a result of which the thin film is forced into the pores upon application of pressure to the unsupported side of the film. Even with the use of such supports, the thin films continue to rupture. Because of the large mesh or pore size of existing supports, the non-porous films must have adequate mechanical strength to resist deformation and rupture into the support. This greatly restricts the choice of materials that can be used as the film former.

Since the productivity of a permeation unit is the result of the pressure difference across the membrane multiplied by the efficiency number, the separation membrane in any apparatus must be capable of withstanding substantial pressure. Where tubes of relatively large diameter are employed, the wall thickness must be large if the tubes are to have sufficient strength to withstand the pressures necessary in order to operate the apparatus efficiently.

It is an object of the present invention to provide an apparatus for the separation of components of fluid mixtures by permeation through a non-porous membrane which will have greater efficiency than any previously designed and which is capable of a much greater productivity. A further object of the invention is to provide non-porous membranes of extremely small diameter tubes or hollow filaments which are comprised of porous glass coated with non-porous organic polymer films. A still further object is to provide a system which permits the use of weak or non-self-supporting film-forming materials. Another object is to permit the use of film-forming materials which are not capable of being fabricated into fine, hollow filaments.

According to the present invention, gases and liquids may be separated from mixtures by permeation apparatuses in far greater efficiency than has heretofore been possible, by the use of non-porous organic polymer films coated on extremely fine hollow porous glass filaments as the support for the polymer film. By employing the supported hollow filaments, the amount of active surface per unit of apparatus can be increased to an extent whereby the efficiency of the apparatus employed may be increased thousands of times over that possible when employing large diameter tubes or supported sheets. The porous glass support and the non-porous permeation barrier together comprise the walls of very fine, hollow fibers of a size ranging preferably from 22 to 250 microns in external diameter, in which the glass support may vary from approximately 20 to 248 microns in external diameter while the coating can vary from 1 to 32 microns in thickness. Furthermore, the hollow fibers with coating should be of such proportions that a device filled with these fibers in square close-packing will have an efficiency number of at least 20,000 cm.$^{-2}$. The terms "close-packed hexagonal" and "close-packed square" as applied to various structures, such as for example crystalline structures formed by atoms, are conventional and well known. The term is disclosed and illustrated for instance in the "International Dictionary of Physics and Electronics," published by the Van Nostrand Company. In practice, the pressure vessel containing the hollow fibers will be somewhat larger than the volume corresponding to the square close-packed arrangement in order to allow for mechanical handling.

In general, the hollow glass fibers used in this invention should have a wall thickness to give them strength enough to withstand external pressures of several thousand pounds per square inch. To this end, it is usually desirable to use glass fibers having an external diameter to wall thickness of 6:1 to 9:1. Of course, hollow fibers of lower or higher external diameter to wall thickness ratios may be employed as they become available from changes in glass technology. Where low pressures are to be used, the ratio may go as high as 18 to 1 or higher, provided the outside diameter still permits the attainment of an efficiency number of at least 20,000 cm.$^{-2}$.

Using such capillary fibers, it is possible to obtain efficiency numbers (see formula above) far greater than heretofore contemplated. For instance, using apparatus as more particularly described in an article entitled, "Process Natural Gas by Permeation," by C. J. Walters, published in Petroleum Refinery, May 1959, pp. 147–150 incl., with permeation tubing of 1570 microns outside diameter and 1140 microns inside diameter, and with the geometrical arrangement disclosed, one obtains an efficiency number of only 7.9 cm.$^{-2}$. Even when the tubing is packed close together (in square close-packing, that is, where all tubes are parallel and each is in contact with 4 other tubes), a maximum efficiency number of only 255 cm.$^{-2}$ is possible.

In a device contemplated by the present invention, using composite hollow fibers having an outside diameter to wall thickness preferably not more than 18:1 in square close-packing, efficiency numbers as follows are obtained using composite hollow fibers of dimensions specified in microns:

TABLE I

| Outside Diameter | Barrier Thickness | Porous Glass Diameter | Efficiency Number |
| --- | --- | --- | --- |
| 250 | 18.5 | 213 | 20,000 |
| 250 | 1 | 248 | 400,000 |
| 170 | 10 | 150 | 56,000 |
| 100 | 32 | 36 | 20,000 |
| 85 | 32 | 21 | 20,000 |
| 100 | 1 | 98 | 1,000,000 |
| 28 | 1 | 26 | 3,450,000 |
| 25 | 2 | 21 | 1,840,000 |

The porous glass which may be employed in the present invention is the acid-leached porous glass obtained prior to vitrification by heating, as described by Corning Glass Works in patents such as U.S. Patents 2,106,744, 2,315,328 and 2,315,329. This glass may be drawn into hollow filaments prior to heat treating and leaching, such as by the process more particularly described by E. B. Shand in Glass Engineering Handbook, published by McGraw-Hill in 1958. These fine hollow porous glass filaments are coated by any desirable method with a non-porous film of organic polymers of any type. The particular polymer will of course be chosen based on its particular selectivity in effecting the desired separation. As clearly disclosed in the prior art, polymeric organic materials in general have different permeation coefficients for different permeating gases or liquids, and it will normally be expected that some separation of any given mixture will occur with the use of a permeation barrier composed of any film-forming organic polymer which results in non-porous films. As illustrative of the types that may be used, may be mentioned cellulose acetate, polyethylene terephthalate, polyvinyl chloride, polyvinylidene chloride, polyhexamethylene adipamide, copolymers of vinylidene fluoride and hexafluoropropylene, regenerated cellulose, polyvinylpyrolidone, polyvinyl alcohol, or any other film-forming polymer which forms a non-porous film with or without a support. The coating of the glass filaments may be carried out in any desired manner, such as by continuously coating the filaments as drawn and treated, or by applying a very dilute solution of the polymers to the bundles of filaments as prepared for use, or by forming the polymer at the external interface of the porous glass by a suitable polymerization or precipitation process. In cases where the polymer is too highly swollen or solubilized by the permeating material, it may be desirable to restrict the degree of swelling by curing or cross-linking. This may suitably be done in place after coating the porous glass filaments.

By the use of hollow fibers or capillaries, an extremely large surface area can be provided and the thickness of the non-porous membrane may be held to a minimum since the porous glass capillary itself is sufficient support for the very thin film of non-porous material to permit relatively high pressures to be used on the outside of such tubes so that the pressure differential can be many times higher than that possible in presently existing equipment employing non-porous filaments or films even much greater in thickness. This permits obtaining very high efficiency from the apparatus. Using porous glass capillaries with an outside diameter of 6 mils and a wall thickness of 0.6 mil, it has been determined that an externally applied pressure of over 2,000 pounds per square inch may be employed.

It has been recognized in the prior art that the separation of gases and liquids through non-porous membranes is, in its present state of development, highly inefficient. To obtain greater efficiency, the use of higher pressures and much larger surface areas per unit volume of equipment are required. By means of the present invention, these difficulties have been overcome since the use of very fine hollow filaments provides an extremely large surface area and the non-porous membrane may be extremely thin when supported by the hollow porous glass filaments.

The apparatus and process of the present invention will of course find use in the separation of gases and liquids from mixtures of the type heretofore described in the literature since any type of non-porous film may be employed with the fine hollow porous glass filaments. In other words, the process is applicable for the desalination of sea water, the concentration of sugar or other solutions, the separation of mixtures of organic compounds, of inorganic compounds, and of mixtures of the same, and the separation of gases such as hydrogen from natural gas, oxygen from nitrogen, helium from methane, and similar separations.

When used in a permeation separation process, the hollow fibers may be mounted in bundles in a pressure vessel as more particularly illustrated in the attached drawing which forms a part of the present application, and in which FIGURE 1 is an elevation view partly in section illustrating a particular arrangement for mounting the bundles in a pressure vessel; FIGURE 2 is a top plan view of the plate in which the bundles of hollow fibers are mounted; and FIGURE 3 is a cross-sectional view of a glass supported polymer coated hollow fiber as used in this invention, greatly magnified.

In the apparatus, as more particularly illustrated in the accompanying drawing, 1 designates a pressure vessel with a main body portion 2 and a removable top 3 which is attached by bolts 4 to a flange on the main body portion. 5 designates a disc clamped between the removable top 3 and the body portion 4 in which the bundles of hollow reinforced fibers 10 may be mounted in a fluid-tight manner at 12, such as by the use of epoxy resins or similar types of plastic materials in which the very thin hollow fibers may be sealed. The hollow fibers may be in bundles of any desired size, and may be mounted close together or separated in any desired manner, as shown in FIGURE 2 of the drawing. As illustrated in FIGURE 1, the epoxy resin plugs 12 in which the fibers are mounted and the holes in the plate 5 are preferably tapered since the mixture of fluids to be separated is introduced under pressure into the body portion of the pressure vessel. The pressure vessel will have an inlet for the mixed fluids as at 6, an outlet for the effluent fluids as at 7, and an outlet for the fluids which permeate the fibers at 8. The plate 5 in which the hollow fibers are mounted may be of any desired material to withstand the pressures employed. As illustrated in FIGURE 1, the hollow reinforced fibers of the present invention are arranged in bundles with the lower end of each sealed in a resin plug or plate 11. Plate 11 of course should fit loosely or be provided with apertures to permit the effluent fluids to readily pass therethrough. Alternatively, these hollow fibers may be folded back on themselves so that both ends of each fiber are sealed in the resin plugs 12 in the openings of plate 5 and open into the chamber 9.

FIGURE 3 illustrates in cross-section an individual reinforced fiber of the present invention in which the porous glass support 15 is coated with a resin 16, it being understood that the thickness of both the porous glass support and the coating are as more particularly described above.

In the following examples, the values given are based on a plant scale apparatus in which the permeation membrane system is arranged as more particularly described above. Such an apparatus, containing approximately 30 cu. ft. of space and having a permeation membrane surface to volume ratio of $3.1 \times 10^3$ sq. ft. per cu. ft., will have approximately $9.3 \times 10^4$ sq. ft. total permeation surface. The values given in the examples are based on the above data, together with that given in the examples. In each example, the permeation membrane is formed by coating the porous glass hollow fibers with cellulose acetate or other coating to the stated thickness. The coatings are prepared by passing into the vessel having the porous glass capillaries mounted therein a solution of the desired polymer such as cellulose acetate having an average degree of acetylation of 2.5, as a 1% acetone solution. After draining the excess cellulose acetate solution, the fibers are dried by passing air through the vessel. Other details of the apparatus are given in the specific examples which are given to illustrate the invention and are not to be construed as limitations thereon.

*Example 1*

Porous glass capillaries used have an outside diameter of 150 microns and a wall thickness of about 16.5 microns, for an outside diameter to wall thickness ratio of 9:1, and have a cellulose acetate coating of about 25 microns in thickness. The apparatus is filled with 1% salt solution, to which is applied hydrostatic pressure of 800 p.s.i.g. Using an inlet flow of about 300 gals./hr. of a 1% salt solution, one obtains a permeate flow of about 140 gals./hr. for this assembly, containing 0.09 to 0.11% salt.

*Example 2*

In the same apparatus and manner as in Example 1, when a feed pressure of 600 p.s.i.g. is employed, one obtains a permeate flow of 85 gals./hr.

*Example 3*

Capillaries are coated as described above by treating with a solution of polymeric phosphine oxide (prepared from isoprene and dichlorophenylphosphine by the process of U.S. Patent 2,671,080) in methanol, and drying with warm air. Using the disclosed apparatus and a permeating pressure of 800 p.s.i.g., a 1.00% salt solution gives a permeate containing 0.09% salt.

*Example 4*

In an apparatus similar to that described above, the porous glass tubes are coated with cellulose acetate by treating with a dilute solution in acetone, drying, and repeating, to give a coat of 25 to 50 microns thickness. A second assembly of tubes is treated once, to give a coat of about 25 to 35 micron thickness. A third assembly of tubes is used without coating, as a control. All three are assembled into separate pressure vessels as described above, with a common pressure manifold. To each unit is added 15.0% sucrose in water solution, of $n_D^{25}$ 1.3552 (corresponding to $n_D^{20}$ 1.3557), which by tabulated values in the Handbook of Sugar Analysis, 1st edition, published by John Wiley, New York, 1912, corresponds to a 15.0% solution. Pure water has $n_D^{25}$ 1.3328. Each unit is placed under 600 p.s.i.g. pressure, and flow and refractive index determined on the permeate to permit determination of sugar concentration. With the uncoated tubes, permeate flow was constant with time at about 500 gals./hr., with permeate containing about 13% to 14% sucrose, and effluent containing about 16% sucrose. With the once coated tubes, permeate flow is about 130 gals./hr. containing about 3% sucrose, with the effluent sugar solution containing about 31% sucrose. Using the twice coated tubes, permeate flow is about 60 gals./hr., containing about 0.3% sucrose, with the effluent solution containing about 24% sucrose.

*Example 5*

Apparatus assembled and coated as described in Example 1, using a 5% cellulose acetate solution in acetone for coating, is used to separate methane and carbon dioxide. Passing into the apparatus a 50:50 mixture by volume of methane and carbon dioxide at 800 p.s.i.g. total pressure, gave a permeate of over 90% carbon dioxide at a permeate rate of 19,000 cu. ft./hr.

*Example 6*

The tubes of the previously described apparatus are coated with impact grade polystyrene (material as described in Modern Plastics for August 1959, p. 115) by using a 1% to 5% tetrahydrofuran solution, giving a coating of about 10 microns in thickness. A feed of about 1400 cu. ft. of air per hour at 175 p.s.i. pressure gives a permeate of about 500 cu. ft./hr. at one atmosphere pressure containing over 40% by volume of oxygen.

It is of course understood that, to obtain higher degrees of separation of the desired fluids from mixtures of the same with other fluids, the separation procedure may be repeated two or more times.

It will be obvious to those skilled in the art that the very fine composite hollow fibers used to effect the separation of fluids as described above may be arranged in apparatus of different types without departing from the spirit of this invention.

I claim:

1. An improved intermediate pressure apparatus for continuously separating a permeable fluid having a molecular size at least equal to that of helium from a fluid mixture according to the differential permeation rates of each of the mixture components through at least one non-porous membrane structure, said apparatus comprising a fluid-tight housing means defining an enclosed fluid separation zone, said apparatus further comprising, at least one non-porous membrane structure in an elongated tubular disposition in said housing means, each membrane structure supported by means of an elongated flexible small diameter hollow filament consisting of a single unitary unbroken continuous element formed of a porous fluid-permeable composition, a second means cooperating with said housing means and said filament to support said filament and said membrane structure in said fluid separation zone, said membrane structure formed of solid, non-porous fluid permeable synthetic organic polymeric composition, said membrane structure composition being permeable to other fluids in addition to hydrogen and helium, each said filament engaging said membrane structure and secured thereto to form a unitary composite assembly, each composite assembly formed by such filament and membrane structure having an exterior surface and an interior surface, an external diameter and, an internal diameter, said membrane structure having a thickness between about 1 and about 32 microns, said apparatus comprising a third means, cooperating with said housing means for directing, at a given pressure and below a temperature at which said membrane structure would be rendered inoperative by thermal deterioration, an initial fluid mixture comprising at least one fluid with a finite permeation rate through said membrane structure composition relatively significantly higher than the finite permeation rates of any other component of said mixture through said membrane structure composition, against one of the surfaces of each composite assembly, said pressure, said membrane structure composition, and said initial mixture being such that a portion of said mixture continuously permeates through each composite assembly to its other surface, said apparatus further comprising a fourth means, cooperating with said housing means, for collecting and removing from said other surface of each composite assembly, at a pressure lower than said given pressure, a permeate mixture corresponding to said initial mixture but enriched in the fluid having the highest permeation rate, the compositions of said filament and membrane structure, the diameter, and wall thickness of said hollow filaments, and the thickness of said membrane structure selected such that each of said composite assemblies have sufficient strength to continuously withstand intermediate pressures of from about 175 to about 2000 p.s.i. below said temperature, and such that a plurality of such composite assemblies and a plurality of portions of a single such assembly, each plurality arranged in a square close-packed parallel arrangement within a given volume of the separation zone will provide a sufficiently high amount of effective membrane surface area of minimum thickness with adequate strength to give a high fluid separation productivity at said pressures and for said permeation rates.

2. The improved apparatus of claim 1 in which each said porous filament is formed of a glass composition.

3. The improved apparatus of claim 1 which is so constructed and arranged that said fluid mixture first contacts the exterior surface of each of said composite assemblies.

4. The improved apparatus of claim 1 in which said housing means comprises an elongated cylindrical casing element aligned in a substantially vertical direction, each of said composite assemblies being supported at their upper ends by said second means and maintained pendulously by gravity in substantially vertical alignment with said casing element and being spaced laterally from each other and from the wall of said casing element.

5. An improved intermediate pressure apparatus for continuously separating a permeable fluid having a molecular size at least equal to that of helium from a fluid mixture according to the differential permeation rates of each of the mixture components through at least one non-porous membrane structure, said apparatus comprising a fluid-tight housing means defining an enclosed fluid separation zone, said apparatus further comprising, at least one non-porous membrane structure in said housing means, each membrane structure supported by means of a coextensive support member consisting of a single unitary unbroken continuous acid leached porous fluid-permeable glass element, a second means cooperating with said housing means and said member to support said member and said membrane structure in said fluid separation zone, said membrane structure being formed of solid, non-porous fluid permeable synthetic organic polymeric composition, said membrane structure composition being permeable to other fluids in addition to hydrogen and helium, each said member engaging said membrane structure and secured thereto to form a unitary composite assembly, each composite assembly formed by such member and membrane structure having a first major surface and a second major surface, a given thickness, said membrane structure having a thickness between about 1 and about 32 microns, said apparatus comprising a third means, cooperating with said housing means for directing, at a given pressure and below a temperature at which said membrane structure would be rendered inoperative by thermal deterioration, an initial fluid mixture comprising at least one fluid with a finite permeation rate through said membrane structure composition relatively significantly higher than the finite permeation rates of any other component of said mixture through said membrane structure composition, against one of the surfaces of each composite assembly, said pressure, said membrane structure composition, and said initial mixture being such that a portion of said mixture continuously permeates through each composite assembly to its other major surface, said apparatus further comprising a fourth means, cooperating with said housing means, for collecting and removing from said other major surface of each composite assembly, at a pressure lower than said given pressure, a permeate mixture corresponding to said initial mixture but enriched in the fluid having the highest permeation rate, the compositions of said member and membrane structure, the given thickness of said assembly, thickness of said membrane structure, and the thickness of said membrane structure selected such that each of said composite assemblies have sufficient strength to continuously withstand intermediate pressures of from about 175 to about 2000 p.s.i. below said temperature, and such that a plurality of such composite assemblies and a plurality of portions of a single such assembly, each plurality arranged in a given volume of the separation zone will provide a sufficiently high amount of effective membrane surface area of minimum thickness with adequate strength to give a high fluid separation productivity at said pressures and for said permeation rates.

References Cited by the Examiner

UNITED STATES PATENTS

| 2,536,610 | 1/1951 | King et al. | 55—158 |
| 2,911,057 | 11/1959 | Green et al. | 55—158 |
| 2,958,391 | 11/1960 | De Rosset | 55—16 |
| 3,019,853 | 2/1962 | Kohman et al. | 55—16 |
| 3,060,119 | 10/1962 | Carpenter | 210—22 |
| 3,100,868 | 8/1963 | McAfee | 55—16 |
| 3,135,591 | 6/1964 | Jones | 55—158 X |
| 3,172,741 | 3/1965 | Jolley | 55—16 |

FOREIGN PATENTS 1,258,142  2/1961  France.

OTHER REFERENCES

Journal of the Franklin Institute, July 1958, vol. 266, pages 80 and 81, and article entitled, "Helium Separation and Purification."

Brubaker et al.: "Separation of Gases by Plastic Membranes," in Industrial and Engineering Chemistry 46 (4) pp. 733–739, April 1954.

Walters, C. G.: Process Natural Gas by Permeation in Petroleum Refiner (38) (5) pp. 147–150, May 1959.

REUBEN FRIEDMAN, *Primary Examiner.*

HERBERT L. MARTIN, *Examiner.*